United States Patent [19]

Fulenwider et al.

[11] 4,071,753
[45] Jan. 31, 1978

[54] TRANSDUCER FOR CONVERTING ACOUSTIC ENERGY DIRECTLY INTO OPTICAL ENERGY

[75] Inventors: John E. Fulenwider, Concord; John Gonsalves, Woburn, both of Mass.

[73] Assignee: GTE Laboratories Incorporated, Waltham, Mass.

[21] Appl. No.: 563,869

[22] Filed: Mar. 31, 1975

[51] Int. Cl.² .............................................. G02B 5/14
[52] U.S. Cl. ................................. 250/227; 250/199; 250/231 R; 350/96 C
[58] Field of Search ............... 250/227, 231 R, 231 P, 250/233, 199, 234; 350/96 R, 96 C

[56] References Cited

U.S. PATENT DOCUMENTS

| | | | |
|---|---|---|---|
| 1,642,011 | 9/1927 | Chubb | 250/199 |
| 1,787,647 | 1/1931 | Sollie | 250/231 R X |
| 1,981,999 | 11/1936 | French | 250/199 |
| 2,415,436 | 2/1947 | Maris | 250/232 R X |
| 3,044,349 | 7/1962 | Watrous | 356/45 |
| 3,056,297 | 10/1962 | Duke | 250/227 X |
| 3,122,922 | 3/1964 | Kramer | 350/96 R X |
| 3,224,279 | 12/1965 | Galli et al. | 250/227 X |
| 3,466,446 | 9/1969 | Fassett | 250/199 |
| 3,514,617 | 5/1970 | Klyce | 250/227 |
| 3,564,264 | 2/1971 | Karuhn et al. | 250/231 R X |
| 3,596,513 | 8/1971 | Sandstet | 250/231 P X |
| 3,624,404 | 11/1971 | Hines | 250/231 P |
| 3,737,629 | 6/1973 | See | 250/227 X |
| 3,781,092 | 12/1973 | Sussman et al. | 250/227 X |
| 3,809,908 | 5/1974 | Clanton | 250/227 |
| 3,829,195 | 8/1974 | Rawson | 350/96 C |
| 3,874,779 | 4/1975 | Thiel | 350/96 C X |
| 3,936,631 | 2/1976 | Muska | 250/227 |

*Primary Examiner*—Eugene R. La Roche
*Attorney, Agent, or Firm*—Bernard L. Sweeney; Fred Fisher

[57] ABSTRACT

A transducer is disclosed in which energy received from either mechanical or acoustic sources is converted into modulated optical power. The transducer is comprised of three basic components, an input optical fiber, an output optical fiber and a means for varying the optical coupling coefficient between the two fibers in response to information containing energy received from a mechanical or acoustic source. The input optical fiber carries a steady state optical signal which may be either continuous or pulsed. The means operates to control the coupling of the steady state optical signal into the output optical fiber. An intensity modulated output signal is then carried by the output optical fiber away from the transducer. The intensity modulated output signal may be either detected and thereby converted to electrical energy for transmission or may be transmitted in an optical form if optical communications facilities are available.

5 Claims, 7 Drawing Figures

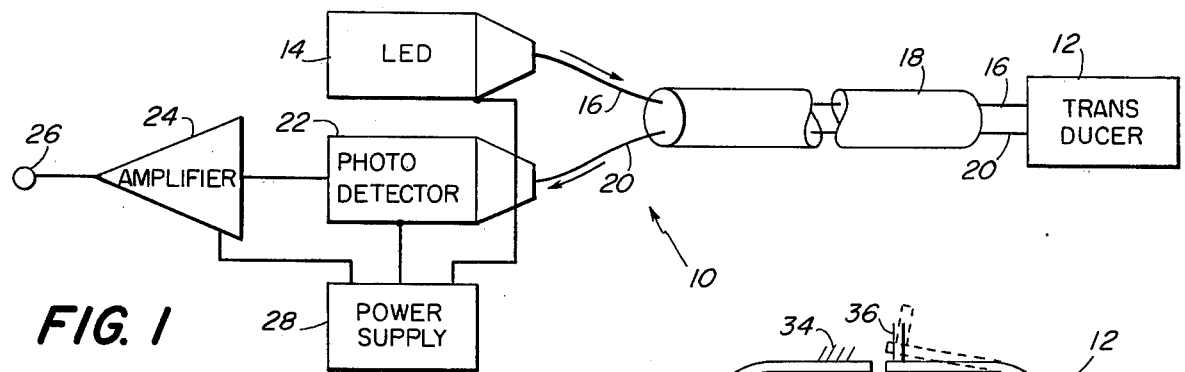
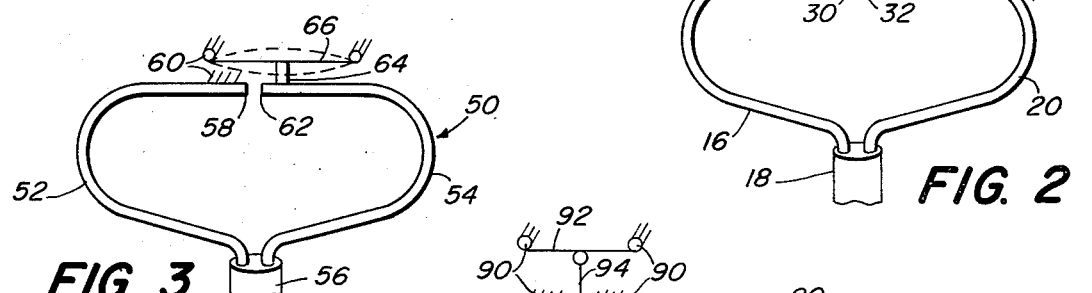
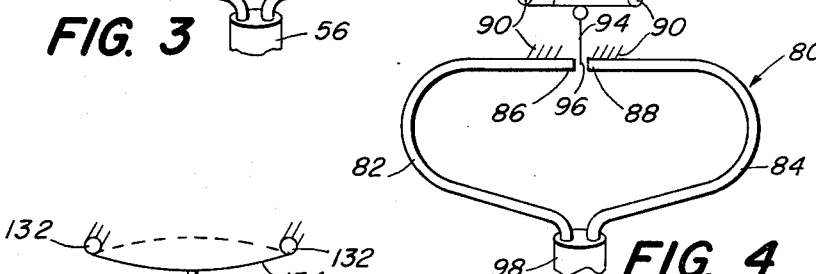
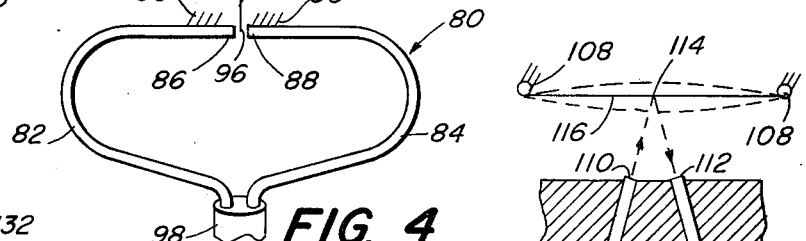
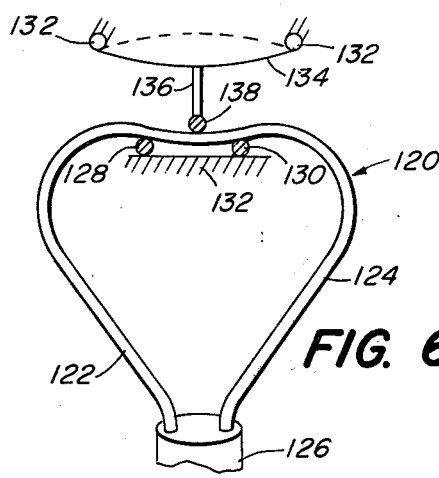
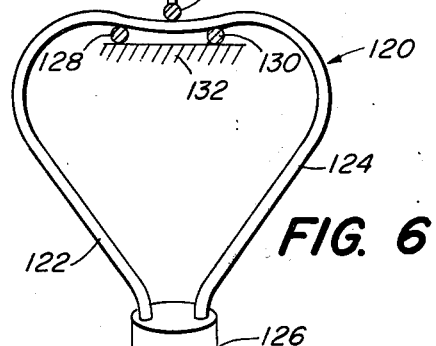
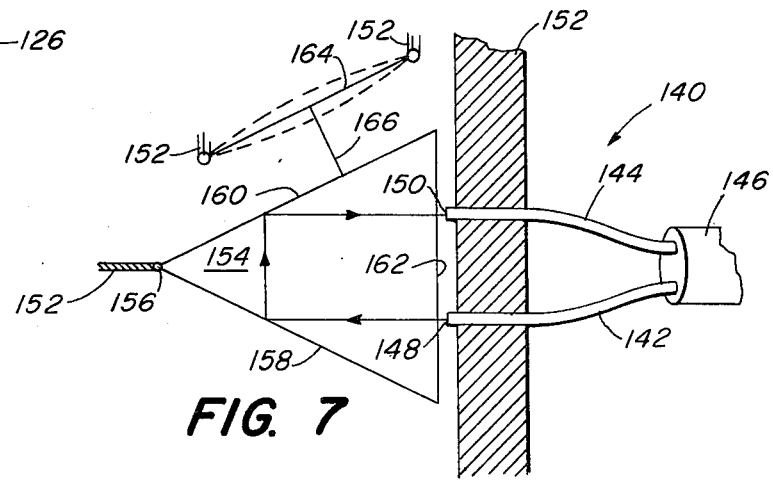

4,071,753

TRANSDUCER FOR CONVERTING ACOUSTIC ENERGY DIRECTLY INTO OPTICAL ENERGY

BACKGROUND OF THE INVENTION

The present invention is related generally to transducers, i.e., devices which transform energy received of one kind to energy transmitted of a second kind. The invention relates more specifically to a transducer which responds to mechanical or acoustic input energy signals and transforms the information contained in the mechanical or acoustic signals into optical signals.

Recently, efforts have been expended in many technological areas to determine the possibility of utilizing light energy in place of traditional electrical energy to perform a wide variety of functions. One area of considerable importance in which significant progress has been made toward the use of light instead of electrical signals is in communications. Here, optical fibers in which light is retained by total internal reflection have been utilized to convey frequency multiplexed signals at relatively high efficiencies. The primary purpose for looking to light energy for use in communications is that by such frequency multiplexing techniques, a significantly greater amount of information may be carried on a single beam of light than on an electrical signal because of the greater frequency range over which such multiplexing may take place. Presently, nearly all information which is carried on such an optical communications link is initially perceived by standard electrically operated components, such as microphones. The electrical signals are then applied to electrooptic or similar devices to modulate various wavelength components of the light beam for transmission. Obviously, this electrical to optical energy transfer is accomplished at a loss in overall efficiency and greatly increases the cost and complexity of any system employing an optical medium for transmission purposes.

The present transducers which are utilized to perceive information contained in an environment are generally electrical in nature and are affected by all of the problems which customarily affect the operation of electrical devices. For example, electromagnetic interference (EMI) can strongly affect the performance of information carrying or generating electrical components and systems whereas light is impervious to EMI. Conversely, optical communications system components can be fabricated entirely of non-metallic materials. Therefore, such optical communications systems components do not disturb local magnetic fields thereby making the presence of such components difficult to detect. Electrical transducer devices necessarily have contacts therein. These contacts are susceptible to wear, to the formation of arcs therebetween, and to shorting. These characteristics of electrical transducers at least hinder the use of such devices in many environments. For example, where the environment contains high humidity and/or hazardous atmospheres, special precautions must be taken to prevent catastrophic results.

SUMMARY OF THE INVENTION

It is, therefore, an object of the present invention to provide a novel transducer device which is capable of transforming information received directly into modulated optical power without an intervening electrical link.

It is a second object of the invention to provide such an optical transducer which is suitable for use with mechanical and acoustic sources of energy.

It is another object of the invention to provide such an optical transducer which may be used as a microphone.

It is another object of the invention to provide such an optical transducer which may be used as a displacement transducer.

It is a further object of the invention to provide such an optical transducer which may be utilized as an accelerometer.

It is a still further object of the invention to provide such an optical transducer which is simple in construction and which may be modified so as to be compatible with a wide variety of potential applications.

Briefly, the invention in its broadest aspect is an optical transducer for use with mechanical and acoustic sources of energy. The transducer includes an input optical fiber for carrying steady state optical power, the input optical fiber having an output end thereon. An output optical fiber is provided for carrying modulated optical power away from the transducer and has an input end thereon. The input end is normally optically positioned relative to the output end of the input optical fiber so that a predetermined portion of the optical power carried by the input optical fiber is coupled into the output optical fiber. Finally, means are provided for varying the amount of optical power coupled from the input optical fiber into the output optical fiber in response to information containing energy received from a source. Modulated optical power is thereby produced in the output optical fiber where the modulation is indicative of the information received.

Further objects, advantages and features of the invention will be apparent from the following detailed description of the preferred embodiments taken together with the accompanying drawing.

BRIEF DESCRIPTION OF THE DRAWING

In the Drawing:

FIG. 1 is a schematic diagram of an optical communication system according to the present invention in which a completely optical transducer is utilized;

FIG. 2 is a partially schematic diagram of a simple optical transducer according to the present invention;

FIG. 3 is a partially schematic diagram of another embodiment of an optical transducer according to the present invention in which one optical fiber is moved relative to the other in response to the lateral movement of a diaphragm;

FIG. 4 is a partially schematic diagram of another embodiment of an optical transducer according to the present invention in which both optical fibers are fixed in position and the coupling coefficient therebetween is affected by interrupting a portion of the optical energy as it is transmitted between the optical fibers;

FIG. 5 is a partially schematic diagram of another embodiment of an optical transducer according to the present invention in which both fibers are fixed in position and are pointed at a spot on a reflective surface of a diaphragm in its normal position so that any movement of the diaphragm affects the coupling efficiency between the optical fibers;

FIG. 6 is a partially schematic diagram of another embodiment of an optical transducer according to the present invention in which a continuous optical fiber is employed which is bent in response to perceived energy in order to affect the transmission of optical energy through the optical fiber; and FIG. 7 is a partially schematic diagram of another embodiment of an optical transducer according to the present invention in which a porro prism is rocked about its apex in response to the perceived information to modulate light being coupled between the fixed input and output optical fibers by reflection within the prism.

DETAILED DESCRIPTION OF THE PREFERRED EMBODIMENTS

In referring to the various figures of the drawing hereinbelow, like reference numerals will be used to refer to identical parts of the apparatus.

Referring initially to FIG. 1 of the drawing, an optical communications system which is referred to generally by the reference numeral 10 is shown in which an optical transducer 12 according to the present invention is employed. The optical transducer 12 is completely optical in nature and employs no electrical connections or signals therein. The system 10 operates on the principle of producing an output optical signal whose amplitude is proportional to the input information variation with an optical fiber cable being utilized to convey the output optical power variation from the transducer 12 to a suitable destination.

A light source 14 emits a steady state beam of light which is coupled into an optical fiber 16. The optical fiber 16 is carried in an optical fiber cable 18 to the transducer 12 where it serves as an input optical fiber. The light source may be located at any desired distance from the transducer 12. Similarly, an output optical fiber 20 passes from the transducer 12 through the optical fiber cable 18 to a photodetector 22 which also may be disposed at any desired distance from the transducer. The output of the photodetector is amplified by an amplifier 24 and passed to an output terminal 26 to which any suitable piece of equipment may be connected to utilize the information emplaced on the optical signal by the transducer 12. A power supply 28 supplies electrical power to the light source 14, the photodetector 22 and the amplifier 24, and may be portable.

The light source 14 may operate in either the visible or infrared portions of the electromagnetic spectrum. The light source 14 supplies steady state optical power which is coupled into the input optical fiber 16. The steady state optical power may be provided in any convenient form; however, two forms are presently preferred. Firstly, a constant intensity output may be supplied from the light source 14. Secondly, the light source 14 in supplying steady state optical power may supply a train of constant amplitude pulses at a sufficiently high repetition rate. In the latter case, amplitude modulation of the pulse train produces pulse amplitude modulation which is suitable for use directly by some audio systems. The light source 14 may be of any convenient and desirable form; however, the presently preferred device for performing this function is a light emitting diode. Such components are readily available, consume a minimum of power, may be easily adapted for use in optical fiber systems, and may be operated continuously or may be pulsed.

The embodiment of the invention shown in FIG. 1 utilizes a photodetector 22 for transforming the information carried on the optical signal being conveyed in the optical fiber 20 into electrical energy which may be utilized for the desired purpose with standard equipment. However, it is also included within the purview of the invention that if and when devices become available which are suitable for directly utilizing amplitude modulated optical signals for performing the desired functions, that a photodetector unit such as shown in FIG. 1 will not be necessary within the apparatus of the invention. For example, many passive and active optical components are now producible in integrated optical form so that the signal from the optical fiber 20 may be directly introducible into further optical signal processing apparatus.

When a photodetector 22 is incorporated into the apparatus, the presently preferred form consists of a photodiode which for economic reasons is preferably of the non-avalanche type. A typical photodiode which is suitable for use in this application is model SGD-040A silicon photodiode produced by EG & G, Inc., Bedford, Mass. The photodiode converts the incident optical power into an electrical signal containing the information derived from the optical signal which may then be amplified by the detector amplifier 24. The detector amplifier provides sufficient gain so that its output may be utilized in whatever succeeding apparatus is connected to the output terminal 26.

Turning now to FIGS. 2 through 7, there are shown specific embodiments of optical transducers according to the present invention which can be incorporated into the system shown in FIG. 1. FIG. 2 is an optical transducer identified generally by the reference numeral 12 in which one of a pair of associated optical fibers 16 an 20 is fixed while the other is movable in response to an external acoustic or mechanical stimulus. In this particular embodiment, the output end of the input optical fiber 16 is fixed to a support 34 which may be, for example, a portion of a transducer housing in which the various components are enclosed and protected. The output optical fiber 20 has its input end 32 normally aligned essentially parallel to the output end of the input optical fiber 16 and in opposition thereto. The optical fiber ends 30 and 32 are preferably quite close to each other so that good coupling efficiency therebetween may be attained. In this manner, a predetermined portion of the optical power emitted by the input optical fiber 16 may be coupled into the output optical fiber 20. A means 36 is affixed to the input end 32 of the output optical fiber 20 and serves to receive information from an external acoustic or mechanical source in the environment in which the transducer 12 is located. In response to the information received from the source, the means 36 moves the input end 32 of the output optical fiber 20 relative to the output end 30 of the input optical fiber 16 so that the coupling efficiency between the two optical fibers is varied in direct response to the information received from the source. Therefore, the amount of optical energy coupled into the output optical fiber 20 varies as a direct function of the position of the input end 32 relative to the output end 30. In this manner, an amplitude modulated output optical signal is carried by the output optical fiber 20 through the optical fiber cable 18 to the apparatus which is to utilize the optical signal.

The means 36 for receiving information from the source varies depending upon the type of information to be received from that source. A simple push-button may be utilized if the device 12 is to operate as a simple switch or a direct physical connection could be made to a movable member such as a door. In this case, mere displacement of the input end 32 so that the coupling efficiency is reduced to zero is necessary. However, if the transducer 12 is to receive energy which is oscillatory, such as acoustic or vibrational energy, the means 36 is usually attached to a member which is capable of sensing the acoustic or vibrational energy directly. A typical example of such an energy sensing member, which may be employed in that instance where the transducer is to serve as a microphone, is a diaphragm. In the succeeding descriptions relative to FIGS. 3 through 7, the devices described will each include a diaphragm as an information receiving member; however, it should be understood that such an information receiving member is merely exemplary and all other such members are also included within the purview of the invention as described.

Referring now specifically to FIG. 3, there is shown an optical transducer 50 having an input optical fiber 52 and an output optical fiber 54 which pass through an optical fiber cable 56. Similarly to the input optical fiber 16 in FIG. 2, the input optical fiber 52 in this embodiment has its output end 58 fixed to a transducer housing support 60 whereas the input end 62 of the output optical fiber 54 is affixed by means of a tying member 64 to an energy receiving diaphragm 66. The respective ends of the optical fibers are aligned relative to each other as fibers 16 and 20 of FIG. 2. The diaphragm 66 is also supported at its periphery by the transducer housing 60.

The oscillatory, movement of the diaphragm 66 in response to the impingement of acoustic energy thereon, is shown by the dotted lines on either side of the solid line which is the normal position of the diaphragm 66. When in that normal position, a predetermined portion of the optical power carried by the input optical fiber 52 is transferred to the output optical fiber 54. Preferably, the portion of the energy which is coupled into the output optical fiber 54 when the diaphragm 66 is in its normal position is approximately one-half. Therefore, as the diaphragm oscillates in response to the impingement of the acoustic energy, the coupling coefficient is able to both increase and decrease from the predetermined portion. The displacement of the output optical fiber 54 relative to the input optical fiber 52 may then be determined by whether the coupling coefficient exceeds or is less than that in the normal position.

In the embodiment of the invention shown in FIG. 4, the output end 86 of an input optical fiber 82 and the input end 88 of an output optical fiber 84 are fixed within a transducer support housing 90. The ends 86 and 88 are juxtaposed in a manner similar to FIGS. 2 and 3 and form a narrow gap 96 therebetween. A diaphragm 92 is also supported by and within the transducer housing 90 and has a depending member 94 attached thereto which extends, in the normal position of the diaphragm 92, at least partially into the gap 96. In this manner, a predetermined portion of the optical power emitted from the output end 86 is interrupted prior to impingement on the input end 88. Therefore, when the diaphragm 92 flexes in response to the receipt of acoustic energy, the member 94 reciprocates within the gap 96 at the frequency and amplitude of the diaphragm. As the depending member 94 reciprocates, it blocks the optical power emitted from the input optical fiber 82 to a greater or lesser extent depending upon the position of the member 94 within the gap 96. Therefore, the member 94 serves to modulate the intensity of the optical power received by the output optical fiber 84 and carried by it to the output optical cable 98. The member 94 may be a birefringent wedge, an opaque member, or the like so long as it is capable of interrupting and intensity modulating the optical power emitted from the input optical fiber 82 before being received at the input end 88 of the output optical fiber 84.

Referring now to FIG. 5, there is shown another embodiment of the present invention which is designated generally by the reference numeral 100. In this embodiment, both an input optical fiber 102 and an output optical fiber 104 which are carried to the transducer 100 by an optical fiber cable 106 are supported and fixed within a transducer housing 108. The output end 110 of the input optical fiber 102 and the input end 112 of the output optical fiber 104 are pointed at a spot 114 on and near the center of a diaphragm 116. The bottom surface of the diaphragm 116 on which the spot 114 is located is reflective so that, in its normal position, a predetermined portion of the optical power emitted from the output end 110 is received by the input end 112. As the diaphragm oscillates in response to received acoustic energy, as shown by the dotted lines, the position of the spot 114 varies thereby defocussing the system and causing a time varying alteration in the optical coupling coefficient between the input optical fiber 102 and the output optical fiber 104 thereby providing an intensity modulated output signal in the output optical fiber 104.

In the embodiment of the invention shown in FIG. 6 of the drawing, an optical transducer designated generally by the reference numeral 120 is shown in which an input optical fiber 122 and an output optical fiber 124 are joined at their proximal ends to form a continuous optical fiber passing into and out of an optical fiber cable 126. The continuous optical fiber is positioned across a pair of fixed and spaced supports 128 and 130. The supports 128 and 130 are contained within a transducer housing 132. A diaphragm 134 is also supported within the transducer housing 132 and is attached to a depending member 136 whose distal end 138 bears against the optical fiber at a point centrally disposed between the supports 128 and 130 and in opposition thereto. In this manner, the optical fiber is bent by a force applied by the end 138 such that the radius of curvature of the bend is a function of the position of the diaphragm 134. It is known in the art that bending of an optical fiber causes light propagating through the optical fiber to be radiated from the vicinity of the bend causing a decrease in the transmission of the optical power therethrough. Therefore, by application of a varying degree of bending in response to the impingement of energy on a diaphragm 134, the optical power contained within the output optical fiber 124 is intensity modulated. Although an opposed support system is shown and utilized in the embodiment of FIG. 6, it is included within the purview of the invention that any such means of stressing an optical fiber in order to affect the transmission characteristics thereof is included therewithin.

Referring finally to FIG. 7, an embodiment of the present invention designated generally by the reference numeral 140 is shown in which an input optical fiber 142 and an output optical fiber 144 which are carried by an optical fiber cable 146 are aligned generally parallel to each other. The output end 148 of the input optical fiber 142 and the input end 150 of the output optical fiber 144 are essentially coplanar and are fixed within the transducer housing 152. This embodiment further includes a porro prism pivoted at its apex 156 about a line parallel to the plane of the ends 148 and 150 and midway between the optical fibers. The input optical power from the optical fiber 142 enters the porro prism through its transmitting face 162 and is reflected by total internal reflection at the face 158 to the opposing face 160. At the face 160, the light is again reflected by total internal reflection back through the transmitting face 162 to the output optical fiber 144. Once again, in the normal position for the apparatus, only a predetermined portion of the optical power emitted from the input optical fiber 142 is coupled into the output optical fiber 144. A diaphragm 164 which is also mounted within the transducer housing 152 has a depending member 166 attached near the center thereof. The member 166 is also attached to the porro prism at a distance from the apex 156. Therefore, upon impingement of acoustic energy against the diaphragm 164, the diaphragm oscillates and the porro prism rocks about its pivot point at the apex 156 causing a variation in the optical power reflected by the faces 158 and 160 into the output optical fiber 144. In this manner, intensity modulation of the optical power carried by the output optical fiber 144 is achieved.

While there have been shown and described what are considered to be preferred embodiments of the present invention, it will be obvious to those of ordinary skill in the art that various changes and modifications may be made therein without departing from the spirit of the invention as defined in the appended claims.

We claim:

1. A transducer for converting acoustic energy directly into optical energy without first converting the energy into electrical form comprising:
    an input optical fiber for carrying steady state optical power and having an output end;
    a source of steady state optical power connected to the input optical fiber;
    an output optical fiber for carrying modulated optical power and having an input end, the input end being normally optically positioned relative to the output end of the input fiber so that a predetermined portion of the optical power carried by the input optical fiber is coupled into the output optical fiber;
    a diaphragm for receiving acoustic information containing energy from a source and for producing at an output an oscillatory mechanical motion indicative of the acoustic information;
    means responsive to the mechanical output of the diaphragm for varying the portion of optical power coupled between the input optical fiber and the output optical fiber; and
    a transducer housing to which the output end of the input optical fiber, the input end of the output optical fiber, the diaphragm and the means for varying the portion of coupled optical power are physically connected for support and protection,
    the means for varying the coupled optical power including the respective end of one of the optical fibers being fixedly positioned within the transducer housing and the respective end of the other of the optical fibers being connected to the diaphragm so that upon impingement of information containing acoustic energy against the diaphragm relative oscillatory lateral movement is established between the respective ends of the optical fibers to cause a variance in the optical power coupled into the output optical fiber thereby providing amplitude modulation of the optical power carried by the output optical fiber.

2. A transducer for converting acoustic energy directly into optical energy without first converting the energy into electrical form comprising:
    a transducer housing;
    an input optical fiber for carrying steady state optical power and having an output end fixedly positioned to the housing;
    a source of steady state optical power connected to the input optical fiber;
    an output optical fiber for carrying modulated optical power and having an input end fixedly positioned to the housing in juxtaposed relation with the output end of the input fiber to form a gap therebetween, the input end being normally optically positioned relative to the output end of the input fiber so that a predetermined portion of the optical power carried by the input optical fiber is coupled into the output optical fiber;
    a diaphragm for receiving acoustic information containing energy from a source and for producing at an output an oscillatory mechanical motion indicative of the acoustic information; and
    means connected to the diaphragm and extending into the gap between the respective ends thereby interrupting at least a portion of the optical power emitted from the output end of the input optical fiber so that upon impingement of acoustic energy against the diaphragm lateral movement of the means is established to cause a variance in the optical power coupled into the output optical fiber thereby providing modulation of the optical power carried by the output optical fiber.

3. An optical transducer according to claim 2, wherein the means connected to the diaphragm is a birefringent wedge.

4. An optical transducer according to claim 2, wherein the means connected to the diaphragm is an opaque member.

5. A transducer for converting acoustic energy directly into optical energy without first converting the energy into electrical form comprising:
    an input optical fiber for carrying steady state optical power and having an output end;
    a source of steady state optical power connected to the input optical fiber;
    an output optical fiber for carrying modulated optical power and having an input end, the input end being normally optically positioned relative to the output end of the input fiber so that a predetermined portion of the optical power carried by the input optical fiber is coupled into the output optical fiber;
    a diaphragm for receiving acoustic information containing energy from a source and for producing at an output an oscillatory mechanical motion indicative of the acoustic information;
    means responsive to the mechanical output of the diaphragm for varying the portion of optical power coupled between the input optical fiber and the output optical fiber;
    a transducer housing to which the output end of the input optical fiber, the input end of the output optical fiber, the diaphragm and the means for varying the portion of coupled optical power are physically connected for support and protection, the optical fibers being aligned parallel to each other with the respective ends essentially coplanar and pointed in the same direction; and a porro prism pivoted at its apex and having a transmitting face parallel to the plane of the ends of the optical fibers, the prism being pivoted at its apex about a line parallel to the plane and approximately midway between the optical fibers, the porro prism being connected to the diaphragm so that upon impingement of energy against the diaphragm rocking of the prism about the line occurs causing a variance in the optical power reflected into the output optical fiber thereby producing modulation of the optical power carried by the output optical fiber.

* * * * *